(12) United States Patent
Morgan, Jr.

(10) Patent No.: US 8,100,789 B2
(45) Date of Patent: Jan. 24, 2012

(54) ANTI-SLIP SHEAVES FOR CONTINUOUSLY VARIABLE TRANSMISSIONS

(75) Inventor: Christopher C. Morgan, Jr., Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 573 days.

(21) Appl. No.: 12/277,819

(22) Filed: Nov. 25, 2008

(65) Prior Publication Data
US 2010/0130318 A1    May 27, 2010

(51) Int. Cl.
*F16H 55/56* (2006.01)
(52) U.S. Cl. .............................. 474/8; 474/69
(58) Field of Classification Search ................ 474/8, 11, 474/12, 13, 17, 18, 69, 70, 73, 74
See application file for complete search history.

(56) References Cited

U.S. PATENT DOCUMENTS

| | | | | |
|---|---|---|---|---|
| 1,840,726 A | * | 1/1932 | Lange | 74/365 |
| 2,187,188 A | * | 1/1940 | Whitcomb | 474/8 |
| 2,201,600 A | * | 5/1940 | Waltz | 474/27 |
| 3,375,725 A | * | 4/1968 | Mathison | 474/153 |
| 4,925,432 A | * | 5/1990 | Miyamaru et al. | 474/8 |
| 5,823,903 A | | 10/1998 | Bongers | |
| 6,419,208 B1 | | 7/2002 | Baranda et al. | |
| 6,742,769 B2 | | 6/2004 | Baranda et al. | |
| 6,938,508 B1 | | 9/2005 | Saagge | |
| 7,276,002 B2 | | 10/2007 | Wang et al. | |
| 7,341,533 B2 | | 3/2008 | Wang et al. | |
| 7,604,557 B2 | * | 10/2009 | Ho | 474/8 |
| 2004/0043847 A1 | | 3/2004 | Jonckheere et al. | |
| 2007/0004543 A1 | | 1/2007 | Ishida | |

OTHER PUBLICATIONS

"LuK Innovation: Luk CVT Components; Development Partner to Manufacturers Luk Automotive Systems;" Germany.
Engineer, Serosh, "Cold-Formed Shapes for High Performance Automotive Components," Wetter, Germany.

* cited by examiner

*Primary Examiner* — William A Rivera
(74) *Attorney, Agent, or Firm* — Dinsmore & Shohl LLP

(57) ABSTRACT

A sheave for use in a continuously variable transmission comprises a truncated, substantially conical portion having an inner radius, an outer radius and a contact surface extending between the inner radius and the outer radius. The contact surface of the sheave may include a plurality of concentric step features such that the contact surface is graduated between the inner radius and the outer radius. Each step feature may include a rise portion and a pitch portion. The rise portion of each step feature and the pitch portion of each step feature may extend in a circumferential direction on the contact surface.

19 Claims, 3 Drawing Sheets

ANTI-SLIP SHEAVES FOR CONTINUOUSLY VARIABLE TRANSMISSIONS

TECHNICAL FIELD

The present invention generally relates to continuously variable transmissions and, more specifically, to anti-slip sheaves for continuously variable transmissions.

BACKGROUND

Sheave-type Continuously Variable Transmissions (CVTs) used in vehicles generally comprise an input pulley and an output pulley which are connected by a continuous belt or chain. Each pulley assembly may comprise opposed sheaves having a generally conical configuration. The continuous belt is disposed between the sheaves and frictionally engaged with each sheave. Rotation of the input pulley is imparted to the continuous belt or chain which, in turn, transfers torque to the output pulley thereby rotating the output pulley. The spacing between the sheaves of each pulley may be varied by adjusting the position of one sheave relative to the other along the axis of rotation of the pulley. This is generally accomplished by applying pressure to one of the sheaves while the other remains fixed. As the spacing between the sheaves is adjusted, the position of the continuous belt or chain is varied radially relative to the sheaves. Adjusting the spacing of the sheaves, and therefore the position of the continuous belt or chain disposed between the sheaves, adjusts the drive ratio between the input pulley and the output pulley and, as such, the transmission ratio of the vehicle.

The CVT sheaves are generally conical in shape with a relatively smooth surface which permits adjusting the continuous belt or chain relative to the sheaves as the spacing between the sheaves is adjusted. However, during high-torque duty cycles, the continuous belt or chain may slip relative to the sheaves as the high-torques imparted to the continuous belt or chain by the input pulley overcomes the frictional forces engaging the continuous belt with the surface of the sheaves. The slippage causes the continuous belt to wear and eventually break and/or malfunction. Further, wear debris from the belt may contaminate the CVT and lead to malfunctions elsewhere in the transmission. If slippage of the continuous belt can be prevented, wear would be reduced along with the amount of wear debris generated. Also, if the amount of slippage is reduced, it may be possible to reduce the pressures applied to the sheaves which engage the sheaves with the continuous belt, which, in turn, would reduce parasitic losses in the transmission. This would effectively improve the fuel economy of vehicles using this type of transmission.

Accordingly, a need exists for alternative designs for sheaves for continuously variable transmissions.

SUMMARY

In one embodiment, a sheave for use in a continuously variable transmission comprises a truncated conical portion having an inner radius, an outer radius and a contact surface extending between the inner radius and the outer radius. The contact surface of the sheave may include a plurality of concentric step features such that the contact surface is graduated between the inner radius and the outer radius. Each step feature may include a rise portion and a pitch portion. The rise portion of each step feature and the pitch portion of each step feature may extend in a circumferential direction on the contact surface.

In another embodiment, a sheave for use in a continuously variable transmission includes a truncated conical portion having an inner radius, an outer radius and a contact surface extending between the inner radius and the outer radius. The contact surface may include a plurality of concentric step features such that the contact surface is graduated between the inner radius and the outer radius. Each step feature may include a rise portion and a pitch portion, wherein the rise portion of each step feature and the pitch portion of each step feature extend in a circumferential direction on the contact surface. The rise portion of each step feature and the pitch portion of each step feature may be oriented such that an angle between the rise portion of each step feature and the pitch portion of each step feature is at least 90 degrees. A surface of the pitch portion of each step feature may include a plurality of consecutive support ramps extending from the surface of the pitch portion in a circumferential direction.

In yet another embodiment, a pulley assembly for use in conjunction with a continuously variable transmission, includes a first sheave and a second sheave rotatable about an axis of rotation, wherein the first sheave and the second sheave may be slidably positioned relative to one another along the axis of rotation. The first sheave and the second sheave may each include a truncated conical portion having an inner radius, an outer radius and a contact surface extending between the inner radius and the outer radius. The contact surfaces of the first sheave and the second sheave may be opposed to one another and comprise a plurality of concentric step features such that each contact surface is graduated between the inner radius and the outer radius. Each step feature may include a rise portion and a pitch portion, wherein the rise portion of each step feature and the pitch portion of each step feature extend in a circumferential direction on the contact surface. The rise portion of each step feature and the pitch portion of each step feature may be oriented such that an angle between the rise portion of each step feature and the pitch portion of each step feature is at least 90 degrees. A surface of the pitch portion of each step feature may include a plurality of consecutive support ramps extending from the surface of the pitch portion in a circumferential direction.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 1:
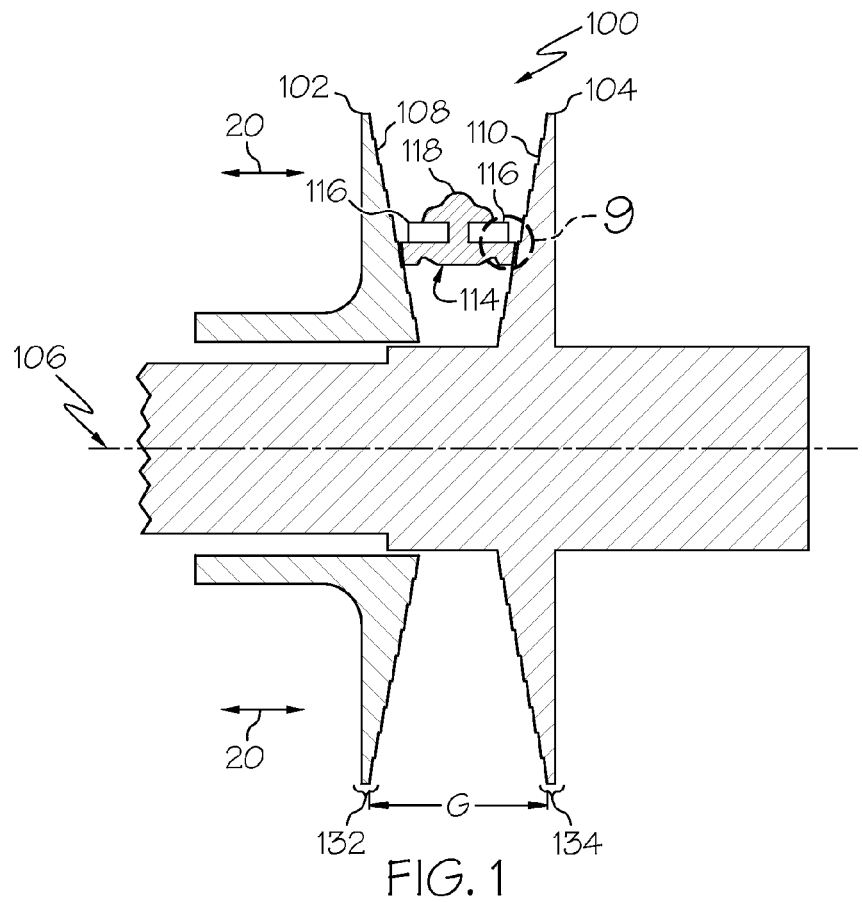
FIG. 1 depicts a pulley of a continuously variable transmission comprising opposed sheaves according to one or more embodiments shown and described herein.

FIG. 1 generally depicts a pulley assembly for use in a continuously variable transmission (CVT) for a vehicle. The pulley may generally comprise a pair of sheaves. A portion of each sheave may have a generally conical shape. The sheaves may be oriented along a rotational axis such that the conical portions of each sheave are opposed to one another. The conical portion of each sheave may comprise a contact surface having a plurality of concentric step features extending from the inner radius of the sheave to the outer radius of the sheave. The concentric step features may provide support for a continuous belt disposed between the sheaves. In one embodiment, each concentric step feature may comprise a plurality of support ramps extending in a circumferential direction. Various embodiments of the CVT transmission pulley and the sheaves of the CVT transmission pulley will be described in more detail herein.

Referring now to FIG. 1, a pulley assembly 100 for a CVT transmission generally comprises a pair of sheaves 102, 104. The sheaves 102, 104 may be generally formed or cast from steel or a similar metallic material and machined to the desired final shape and dimensions. Alternatively, the sheaves 102, 104 may be formed of a polymeric material. The sheaves 102, 104 may have a truncated, substantially conical portion 132, 134 (respectively) with a contact surface 108, 110. The sheaves 102, 104 are generally positioned about an axis of rotation 106 such that the respective contact surfaces 108, 110 are in opposition to each other and the gap G between the sheaves 102, 104 is at a minimum proximate the axis of rotation 106 and increases with increasing distance from the axis of rotation 106 in a direction normal to the axis of rotation 106. In this orientation, the sheaves 102, 104 may be generally axis-symmetric with respect to the axis of rotation 106. The sheaves 102, 104 (and therefore the pulley assembly 100) are rotatable about the axis of rotation 106.

The sheaves 102 and 104 shown in FIG. 1 have been described as substantially conical. Substantially conical, as used herein, means that the contact surfaces 108, 110 of the sheaves 102, 104 diverge from one another in a direction perpendicular to the axis of rotation 106. Accordingly, while the contact surfaces 108, 110 of the sheaves 102, 104 are shown as diverging from one another in a substantially linear manner, the contact surfaces 108, 110 may have some curvature such that the contact surfaces 108, 110 diverge from one another in a non-linear manner.

As depicted in FIG. 1, sheave 102 may be slidably engaged with sheave 104 along the axis of rotation 106 as indicated by arrows 20, while sheave 104 may be fixed along the axis of rotation 106. Accordingly, the position of sheave 102 may be adjusted relative to sheave 104 such that the gap G between the sheaves 102, 104 may be increased or decreased. Sheave 102 may be positioned relative to sheave 104 along the axis of rotation 106 by hydraulic and/or mechanical mechanisms (not shown) operatively coupled to the sheaves, as is known in the art.

A continuous element 114 may be disposed between the transmission sheaves 102, 104. The continuous element 114 may be a continuous belt comprising looped bands 116 (shown in cross section) joined together by a plurality of coupling links 118. The continuous belt 114 is positioned between the sheaves 102, 104 such that portions of the looped bands 116 and the coupling link 118 are in direct contact with both the contact surface 108 of sheave 102 and the contact surface 110 of sheave 104.

While FIG. 1 generally shows one pulley assembly of a CVT, it should be understood that a CVT generally comprises at least two pulley assemblies, specifically an output pulley assembly and an input pulley assembly. The input pulley assembly may be rotationally coupled to the engine of the vehicle while the output pulley assembly may be rotationally coupled to the wheels or axle of the vehicle. The output pulley assembly and the input pulley assembly are aligned with one another such that the continuous element is routed between the sheaves of both pulley assemblies thereby coupling the input pulley assembly to the output pulley assembly. Accordingly, when the input pulley assembly is rotated by the engine, the rotational motion of the input pulley assembly is imparted to the continuous element which, in turn, rotates the output pulley assembly thereby driving the wheels of the vehicle. The drive ratio (e.g., the transmission ratio) between the input pulley assembly and the output pulley assembly may be adjusted by adjusting the position of the continuous element between the sheaves of each pulley assembly, as will be discussed in further detail herein.

Still referring to FIG. 1, the position of the continuous element 114 between the sheaves 102, 104 may be controlled by adjusting the gap G between the sheaves 102, 104 by slidably positioning sheave 102 relative to sheave 104 along the axis of rotation 106. For example, to position the continuous element 114 closer to the axis of rotation 106, the gap G between the sheaves 102, 104 may be increased by moving sheave 102 away from sheave 104. The increase in the gap G between the sheaves 102, 104, combined with the truncated conical shape, allows the continuous belt 120 to be positioned lower (e.g., closer) to the axis of rotation 106. To position the continuous element 114 further from the axis of rotation 106, the gap G between the sheaves 102, 104 may be decreased by moving sheave 102 toward sheave 104. The decrease in the gap G between the sheaves 102, 104, combined with the truncated conical shape, causes the continuous element to be forced away from the axis of rotation 106 and towards the edge of the conical portion of the sheaves 102, 104.

Figure 2:
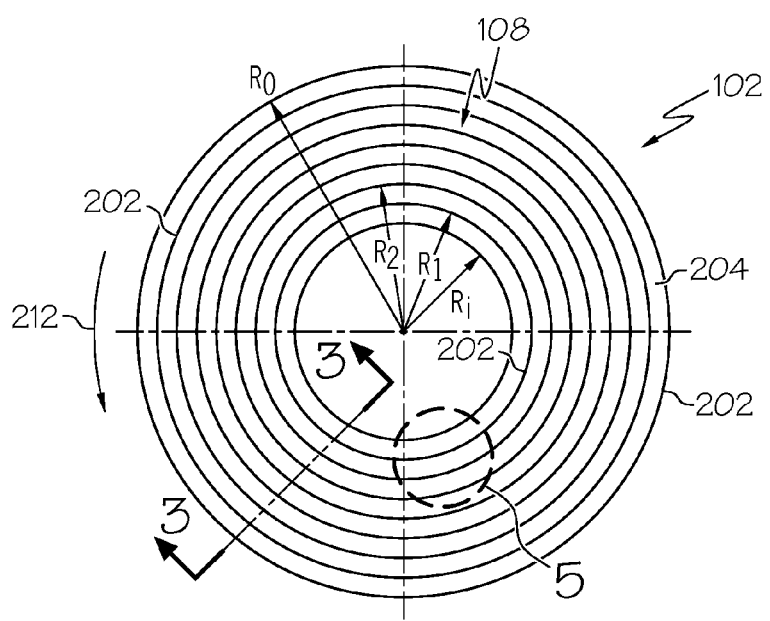
FIG. 2 depicts the surface of a sheave of a continuously variable transmission according to one or more embodiments shown and described herein.

Referring now to FIG. 2, the contact surface 108 of the sheave 102 is shown. The contact surface 108 generally extends between an inner radius $R_i$ and an outer radius $R_o$. The contact surface 108 of the sheave 102 may generally comprise a plurality of concentric step features 202 extending in a radial direction between the inner radius $R_i$ and the outer radius $R_o$ such that the contact surface 108 of the sheave 102 is graduated. The graduations or step features 202 improve the ability of the sheave 102 to grip the continuous element 114 which may be disposed between the sheaves 102, 104, as shown in FIG. 1, thereby preventing the continuous belt 114 from slipping relative to the contact surfaces 108, 110 of the sheaves 102, 104 in a radial direction from $R_o$ to $R_i$, as will be discussed in more detail herein.

It should be understood that, while FIGS. 2-6 refer to the sheave 102 in describing the present invention, the contact surface 110 of the sheave 104 has a substantially similar configuration as the contact surface 108 of the sheave 102. Accordingly, unless otherwise stated herein, the contact surface 110 of sheave 104 will be substantially similar to the contact surface 108 of sheave 102.

The step features 202 may be formed in the contact surface 108 with a machining operation such as milling, grinding, electro-discharge machining or the like. Alternatively, the step features 202 may be cast into the surface of the sheave or otherwise integrally formed with the sheave. Each step feature 202 may comprise a rise portion 206 and a pitch portion 204. However, in the view shown in FIG. 2, only the pitch portion 204 of each step feature 202 is visible. The pitch portion 204 and the rise portion 206 of each step feature 202 extend in a circumferential direction (e.g., the direction indicated by the arrow 212) on the contact surface 108 of the sheave 102. Each concentric step feature 202 may have an outer radius $R_s$ (where s is 1, 2, 3 ... x in the radial direction from $R_i$ to $R_o$) greater than the preceding step feature (e.g., $R_{x+1} > R_x$) along the radial direction from the inner radius $R_i$ to the outer radius $R_o$.

Figure 3:
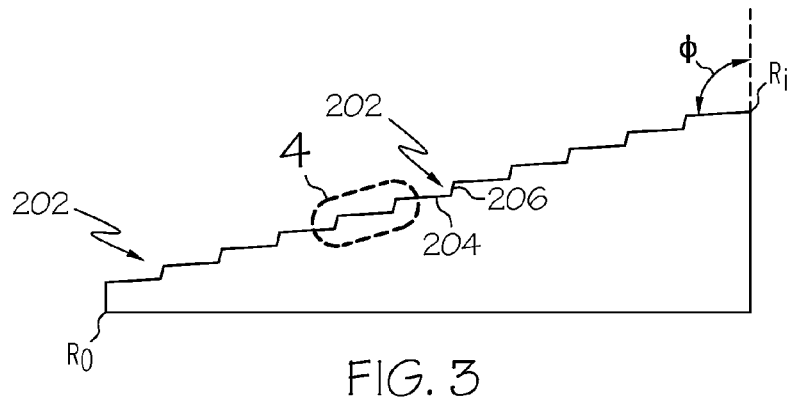
FIG. 3 depicts a cross section of the sheave of FIG. 2 in a radial direction according to one or more embodiments shown and described herein.
Figure 4:
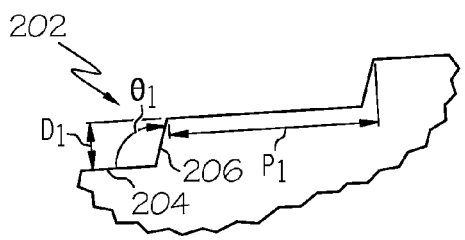
FIG. 4 depicts an enlarged view of the radial cross section of the sheave shown in FIG. 3 according to one or more embodiments shown and described herein.
Figure 9:
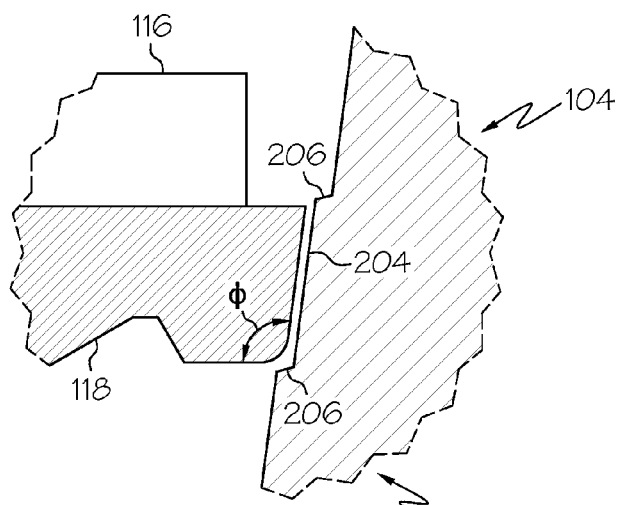
FIG. 9 depicts and enlarged view of a continuous belt engaged with a sheave of the CVT pulley shown in FIG. 1 according to one or more embodiments shown and described herein.

Referring now to FIGS. 3 and 4, a cross section of the sheave 102 is depicted in a radial direction between the inner radius $R_i$ and the outer radius $R_o$. The step features 202 each comprise a pitch portion 204 and a rise portion 206. Each pitch portion 204 is oriented at an angle $\Phi$ to a line parallel to the axis of rotation 106 of the sheave 102. The angle $\Phi$ is generally the same as the angle $\Phi$ of the coupling element 118 of belt 114 (as shown in FIG. 9). In one embodiment, the angle $\Phi$ may be from about 5 degrees to about 10 degrees. However, it should be understood that other angles may be possible depending on the particular design of the belt 114.

The angle $\theta_1$ between the pitch portion 204 and the rise portion 206 may generally be at least about 90 degrees. In one embodiment, as shown in FIG. 4, the angle $\theta_1$ is greater than about 90 degrees. For a given angle $\theta_1$, the rise portion 206 may be of sufficient length such that the distance $D_1$ (defined as shown in FIG. 4) between pitch portions 204 of adjacent concentric steps 202 is greater than about 10 micrometers. In one embodiment, the distance $D_1$ between pitch portions 204 of adjacent concentric steps 202 may be about greater than about 100 micrometers. The pitch portion 104 of the step features may have a length $P_1$ of greater than about 10 mm. While specific examples of the length $P_1$ and distance $D_1$ have been given herein, it should be understood that the length $P_1$ the distance $D_1$ and the angle $\theta_1$ may vary depending on the specific dimensions of the belt or chain element used in conjunction with the CVT transmission and that, in general, the length $P_1$ will be greater than the distance $D_1$.

Referring now to FIGS. 1 and 9 in which a close-up view of a portion of FIG. 1 is shown which depicts the continuous element 114, specifically the looped bands 116 and coupling links 118 of the continuous element 114, engaged with the concentric step features 202 of the sheave 104, when the continuous element 114 is disposed between the sheaves 102, 104 and pressure is applied to the sheaves 102, 104, the step features 202 engage with the continuous element 114. More specifically, the step features 202, specifically the rise portion 206 of the step feature 202, supports the looped bands 116 and coupling links 118 and prevents the continuous element 114 from slipping over the contact surface 110 of the sheave 104 in a radial direction from the outer radius $R_o$ towards the inner radius $R_i$ and towards the axis of rotation 106 of the pulley assembly 100.

Further, it should be noted that, in embodiments where the angle $\theta_1$ between the pitch portion 204 and the rise portion 206 is greater than about 90 degrees, the orientation of the pitch portion 204 to the rise portion 206 may improve the ability of the continuous element 114 to transition between adjacent concentric step features 202 and thereby improve shifting performance of the CVT transmission in which the pulley assembly 100 is installed. For example, referring to FIG. 9, the looped bands 116 and coupling links 118 are supported by the rise portion 206 of the step features 202. As noted herein, the angle $\theta_1$ between the rise portion 206 and the pitch portion 204 is greater than 90 degrees such that the rise portion 206 has a downward declination with respect to the looped bands 116 and coupling links 118. The downward declination of the rise portion 206, combined with the conical shape of the sheave 104, allows the looped bands 116 and coupling links to readily transition to the next lower concentric step feature as pressure between the sheaves is decreased.

Referring now to FIGS. 2 and 5-8, in another embodiment, the sheave 102 comprises a plurality of support ramps 220 in addition to the step features 202 discussed hereinabove. While the step features 202 improve the ability of the sheave 102 to grip the continuous element 114 and prevent the continuous element from slipping in a radial direction over the contact surface 108 of the sheave 102 from $R_o$ towards $R_i$, the support ramps 220 improve the ability of the sheave 102 to grip the continuous element in a circumferential direction (e.g., the direction of the arrow 212) and thus prevent the continuous element from slipping relative to the sheave 102 as the sheave 102 (and therefore the pulley assembly 100) is rotated. Alternatively, the support ramps 220 may prevent the sheave 102 from slipping relative to the continuous element 114 as the continuous element is rotated.

Figure 5:
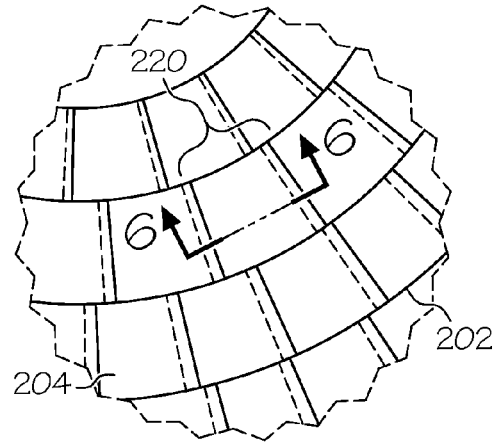
FIG. 5 depicts an enlarged view of a portion of the surface of the sheave of FIG. 2 according to one or more embodiments shown and described herein.

As shown in FIG. 5, each concentric step feature 202 may comprise a plurality of consecutive support ramps 220. The consecutive support ramps 220 extend from the surface of the pitch portion 204 of the step features 202 in a generally circumferential direction (e.g., either in the direction of arrow 212 (counter clockwise) in FIG. 2 or in a direction opposite the direction of arrow 212 (clockwise) in FIG. 2). In the embodiment shown in FIGS. 5 and 6, the consecutive support ramps 220 extend from the surface in a generally circumferential clockwise direction. Like the step features 202, the consecutive support ramps 220 may be formed in the contact surface 108 of the sheave 102 using a machining operation such as milling, grinding, electro-discharge machining or the like. Alternatively, the consecutive support ramps 220 may be cast into the sheave 102 or otherwise integrally formed with the sheave 102.

Figure 6:
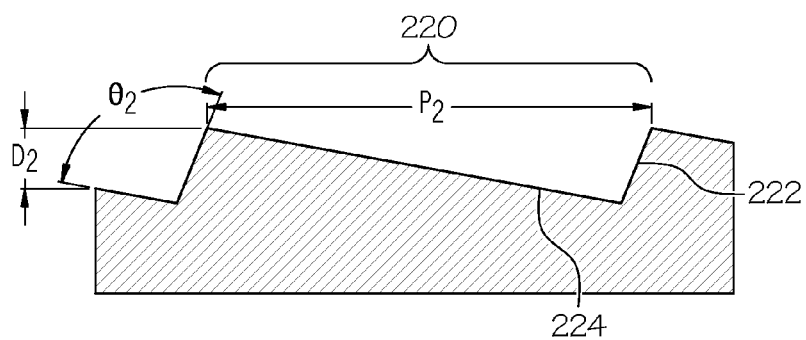
FIG. 6 depicts a cross section of the portion of the enlarged view of the surface of the sheave shown in FIG. 5 according to one or more embodiments shown and described herein.

Referring to the cross section of the contact surface 108 of the sheave 102 depicted in FIG. 6, the support ramps 220 generally comprise a height portion 222 and a length portion 224. In one embodiment, the angle $\theta_2$ between the height portion 222 and the length portion 224 is at least 90 degrees. In another embodiment, the angle $\theta_2$ between the height portion 222 and the length portion 224 is greater than about 90 degrees.

The length $D_2$ of the support ramps 220 will generally depend on the type of continuous element which is being used in conjunction with the pulley assembly 100 in which the sheaves are employed. For example, in one embodiment, for a given angle $\theta_2$, the height portion 222 may be of sufficient length such that the distance $D_2$ (as shown in FIG. 6) is greater than about 10 micrometers. In another embodiment, the distance $D_2$ may be greater than about 100 micrometers. In still another embodiment, the distance $D_2$ may be greater than about 1000 micrometers.

Figure 7:
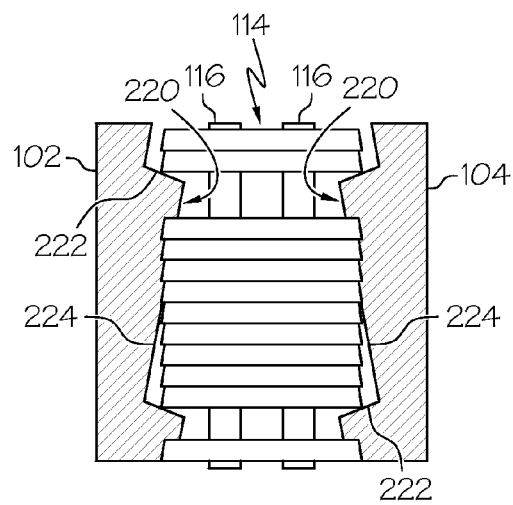
FIG. 7 depicts an enlarged view of a continuous belt engaged with the sheaves of the CVT pulley shown in FIG. 1 according to one or more embodiments shown and described herein.
Figure 8:
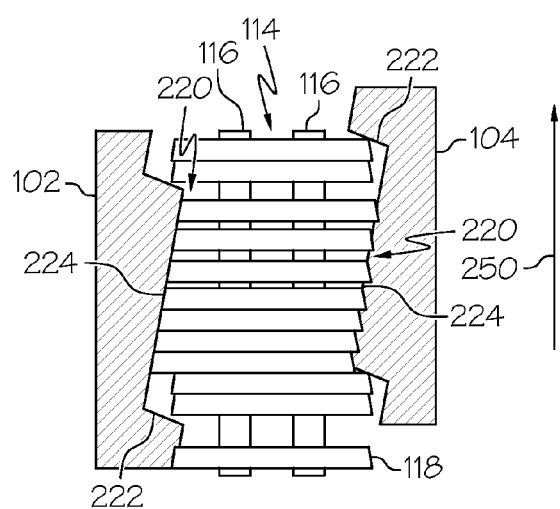
FIG. 8 depicts an enlarged view of a continuous belt engaged with the sheaves of the CVT pulley shown in FIG. 1 according to one or more embodiments shown and described herein.

The length $P_2$ of each consecutive support ramp 220 may be the distance between the maximum height of consecutive height portions 222, as shown in FIG. 6. The length $P_2$ of the support ramps 220 will generally depend on the type of continuous element which is being used in conjunction with the pulley assembly 100 in which the sheaves are employed. For example, when the sheaves are being used in conjunction with a belt-type continuous element 114 comprising a plurality of looped bands 116 joined together with linking elements 118, the length $P_2$ of the continuous support ramps will generally be on the order of the thickness of the linking elements 118 which may generally be about 1 mm. In one embodiment, the length of $P_2$ may be greater than the thickness of the linking elements 118 such that multiple linking elements may stack up on a single ramp 220, as shown in FIGS. 7 and 8. However, when the sheaves are being used in conjunction with a chain-type continuous element, the length $P_2$ of the continuous support ramps will generally be on the order of the pin pitch of the chain which may generally be about 10 mm. Accordingly, the length $P_2$ of the continuous support ramps may generally be 1 mm or greater.

Referring now to FIGS. 7 and 8, a continuous element 114 comprising looped bands 116 and linking elements 118 is shown engaged with the height portion 222 of the consecutive support ramps 220. As discussed hereinabove, the support ramps 220 may extend from the surface of the pitch portion 204 of the step features 202 in different circumferential directions. Accordingly, the support ramps 220 may extend around the contact surface of the sheave in either a first direction or in a second, opposite direction (e.g., the first direction may be a clockwise direction and the second direction may be a counterclockwise direction or vice-versa).

For example, in one embodiment shown in FIG. 7, the support ramps 220 on sheave 102 extend from the contact surface in a first direction which is clockwise while the support ramps 220 on sheave 104 extend from the contact surface in a second direction which is counterclockwise. In this embodiment, as the sheaves 102, 104 are rotated relative to the continuous element 114 (or as the continuous element 114 is rotated relative to the sheaves 102,104) and pressure is applied to the sheaves 102, 104, the height portion 222 of each support ramp become engaged with continuous element 114 thereby gripping the continuous element and imparting the rotation of the sheaves 102, 104 to the continuous element 114 (or vice-versa). More specifically, as the sheaves 102, 104 rotate relative to the continuous element 114, the height portions 222 of the support ramps 220 becomes engaged with the continuous element 114 between adjacent linking elements 118 of the continuous belt 114 causing the rotational motion of the sheaves to be imparted to the continuous belt 114 without slipping in the circumferential direction.

FIG. 8 depicts another embodiment in which the sheaves 102, 104 comprise support ramps 220 which extend from the contact surface of each sheave in the same direction. As shown in FIG. 8, the support ramps 220 extend from the contact surfaces of each sheave 102, 104 in a generally clockwise direction. Depending on the rotational direction of the sheaves 102, 104 and/or the continuous element 114, only one sheave may engage with the continuous element 114. For example, as pressure is applied to the sheaves 102, 104, and the continuous element 114 is rotated in the direction indicated by arrow 250, the height portions 222 of sheave 104 become engaged between adjacent linking elements 118 thus imparting the rotational motion of the continuous element 114 to the sheaves 104. However, as a result of the direction of the support ramps 220 on the sheave 102, the height portions 222 of the support ramps 220 located on sheave 102 do not engage with the continuous element 114. Instead, in this embodiment, engagement of the continuous element 114 with the sheave 102 may only occur if the continuous element is rotated in the opposite direction (e.g., opposite the direction indicated by arrow 250), in which case the continuous element 114 would only engage with the support ramps 220 of sheave 102 and not the support ramps of sheave 104. Accordingly, the embodiment of the pulley assembly shown in FIG. 8 may be useful where the direction of rotation of the pulley assembly may be varied depending on the direction of travel of the vehicle.

While specific examples have been discussed herein in which the continuous element 114 is a continuous belt, it should be understood that the transmission sheaves discussed herein may also be used in conjunction with continuous chains or similar continuous elements that may be known in the art.

It should now be understood that the sheaves shown and described herein may be used in conjunction with a pulley assembly of a continuously variable transmission to improve the grip of the pulley assembly on a belt or chain routed through the pulley assembly thereby reducing slippage of the belt or chain relative to the sheaves. By reducing the slippage of the belt or chain relative to the sheaves, the performance of the continuously variable transmission may be improved due to reduced belt or chain wear and reduced contamination of the CVT as a result of less wear debris accumulating in the CVT. Moreover, the improved grip of the sheaves on the belt or chain may reduce the required amount of pressure which must be applied to the transmission sheaves in order to maintain engagement between the transmission sheaves and the belt or chain. Reducing the amount of pressure applied to the sheaves may, in turn improve the fuel economy of the vehicle in which the sheaves are employed by reducing the parasitic losses associated with the transmission.

For the purposes of describing and defining the present invention it is noted that the term "about" was utilized to represent the inherent degree of uncertainty that may be attributed to any quantitative comparison, value, measurement, or other representation. This term is also utilized herein to represent the degree by which a quantitative representation may vary from a stated reference without resulting in a change in the basic function of the subject matter at issue.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A continuously variable transmission comprising at least one sheave, the at least one sheave comprising a truncated, substantially conical portion having an inner radius, an outer radius and a contact surface extending between the inner radius and the outer radius, wherein:

the contact surface comprises a plurality of concentric step features formed in the contact surface such that the contact surface is graduated between the inner radius and the outer radius, wherein each step feature comprises a rise portion and a pitch portion and the rise portion of each step feature and the pitch portion of each step feature extend in a circumferential direction on the contact surface; and a surface of the pitch portion of each step feature comprises a plurality of consecutive support ramps formed in the surface of the pitch portion, the support ramps extending from the surface of the pitch portion in a circumferential direction.

2. The continuously variably transmission of claim 1 wherein the rise portion of each step feature and the pitch portion of each step feature are oriented such that an angle between the rise portion of each step feature and the pitch portion of each step feature is at least about 90 degrees.

3. The continuously variably transmission of claim 1 wherein each concentric step feature has a radius greater than the preceding concentric step feature along a direction from the inner radius to the outer radius.

4. The continuously variably transmission of claim 1 wherein the rise portion of each step feature is greater than about 10 micrometers.

5. The continuously variably transmission of claim 1 wherein each consecutive support ramp comprises a height portion and a length portion, wherein an angle between the height portion and the length portion is at least about 90 degrees, a distance between the height portions of consecutive support ramps is greater than about 1 mm, and the height portion of each support ramp is greater than about 10 micrometers.

6. A sheave for use in a continuously variable transmission, the sheave comprising a truncated, substantially conical portion having an inner radius, an outer radius and a contact surface extending between the inner radius and the outer radius, wherein:

the contact surface comprises a plurality of concentric step features formed in the contact surface such that the contact surface is graduated between the inner radius and the outer radius, wherein each step feature comprises:

a rise portion and a pitch portion, wherein the rise portion of each step feature and the pitch portion of each step feature extend in a circumferential direction on the contact surface and the rise portion of each step feature and the pitch portion of each step feature are oriented such that an angle between the rise portion of each step feature and the pitch portion of each step feature is at least about 90 degrees; and a surface of the pitch portion of each step feature comprises a plurality of consecutive support ramps formed in the surface of the pitch portion, the support ramps extending from the surface of the pitch portion in a circumferential direction.

7. The sheave of claim 6 wherein the angle between the rise portion of the each step feature and the pitch portion of each step feature is greater than about 90 degrees.

8. The sheave of claim 6 wherein the rise portion of each step feature is greater than about 10 micrometers.

9. The sheave of claim 6 wherein each consecutive support ramp comprises a height portion and a length portion, wherein an angle between the height portion and the length portion is at least about 90 degrees.

10. The sheave of claim 9 wherein a distance between the height portions of consecutive support ramps is greater than about 1 mm.

11. The sheave of claim 9 wherein the height portion of each support ramp is greater than about 10 micrometers.

12. A pulley assembly for use in conjunction with a continuously variable transmission, the pulley assembly comprising a first sheave and a second sheave rotatable about an axis of rotation, wherein the first sheave and the second sheave may be slidably positioned relative to one another along the axis of rotation, the first sheave and the second sheave each comprising a truncated, substantially conical portion comprising and inner radius, an outer radius and a contact surface extending between the inner radius and the outer radius, wherein:

the contact surfaces of the first sheave and the second sheave are opposed to one another and comprise a plurality of concentric step features formed in the contact surface such that each contact surface is graduated between the inner radius and the outer radius, wherein each step feature comprises:

a rise portion and a pitch portion, wherein the rise portion of each step feature and the pitch portion of each step feature extend in a circumferential direction on the contact surface and the rise portion of each step feature and the pitch portion of each step feature are oriented such that an angle between the rise portion of each step feature and the pitch portion of each step feature is at least about 90 degrees; and a surface of the pitch portion of each step feature comprises a plurality of consecutive support ramps formed in the surface of the pitch portion, the support ramps extending from the surface of the pitch portion in a circumferential direction.

13. The pulley assembly of claim 12 wherein the angle between the rise portion of the each step feature and the pitch portion of each step feature is greater than about 90 degrees.

14. The pulley assembly of claim 12 wherein the rise portion of each step feature is greater than about 10 micrometers.

15. The pulley assembly of claim 12 wherein each consecutive support ramp comprises a height portion and a length portion, wherein an angle between the height portion and the length portion is at least 90 degrees.

16. The pulley assembly of claim 15 wherein a distance between the height portions of consecutive support ramps is greater than about 1 mm.

17. The pulley assembly of claim 15 wherein the height portion of each support ramp is greater than about 10 micrometers.

18. The pulley assembly of claim 12 wherein the consecutive support ramps of the first sheave extend from the pitch portions in a first circumferential direction and the consecutive support ramps of the second sheave extend from the pitch portions in a second circumferential direction.

19. The pulley assembly of claim 12 wherein the consecutive support ramps of the first sheave and the consecutive support ramps of the second sheave extend from the pitch portions in the same circumferential direction.

* * * * *